(12) United States Patent
Khan

(10) Patent No.: US 10,694,615 B2
(45) Date of Patent: Jun. 23, 2020

(54) ELECTRICALLY CONNECTING MULTI-LAYER INSULATION BLANKETS

(71) Applicant: Airbus Defence and Space GmbH, Taufkirchen (DE)

(72) Inventor: Mohammad Danish Khan, Meersburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 266 days.

(21) Appl. No.: 15/843,601

(22) Filed: Dec. 15, 2017

(65) Prior Publication Data

US 2018/0184507 A1 Jun. 28, 2018

(30) Foreign Application Priority Data

Dec. 23, 2016 (EP) ..................................... 16206733

(51) Int. Cl.
| | | |
|---|---|---|
| *H05F 3/02* | (2006.01) | |
| *B64G 1/58* | (2006.01) | |
| *F16L 59/02* | (2006.01) | |
| *B32B 15/08* | (2006.01) | |
| *B32B 15/20* | (2006.01) | |

(52) U.S. Cl.
CPC ................ *H05F 3/02* (2013.01); *B32B 15/08* (2013.01); *B32B 15/20* (2013.01); *B64G 1/58* (2013.01); *F16L 59/029* (2013.01); *B32B 2255/06* (2013.01); *B32B 2255/205* (2013.01); *B32B 2307/202* (2013.01); *B32B 2307/204* (2013.01);
(Continued)

(58) Field of Classification Search
CPC .......... H05F 3/02; F16L 59/029; B32B 15/20; B32B 15/08; B32B 2605/18; B32B 2307/204; B32B 2307/202; B32B 2255/205; B32B 2255/06; B32B 2307/304; B64G 1/58
USPC .................................................. 361/218, 216
See application file for complete search history.

(56) References Cited

U.S. PATENT DOCUMENTS

| | | |
|---|---|---|
| 5,038,693 A | 8/1991 | Kourtides et al. |
| 5,111,354 A | 5/1992 | Marzi et al. |

(Continued)

FOREIGN PATENT DOCUMENTS

| | | |
|---|---|---|
| EP | 2428449 A1 | 3/2012 |
| EP | 2530366 A1 | 12/2012 |

(Continued)

OTHER PUBLICATIONS

Extended European Search Report for Application No. 16206733 dated Jul. 24, 2017.

*Primary Examiner* — Dharti H Patel
(74) *Attorney, Agent, or Firm* — Jenkins, Wilson, Taylor & Hunt, P.A.

(57) ABSTRACT

Inter alia an apparatus is disclosed including at least two multi-layer insulation, MLI, blankets, each MLI blanket having a least one bonding point. Therein, a bonding point of a first MLI blanket of the at least two MLI blankets is electrically connected to a bonding point of a second MLI blanket of the at least two MLI blankets. The second MLI blanket further has a grounding point configured to be grounded. Further, a spacecraft comprising such an apparatus is disclosed. Moreover, a method including providing at least two MLI blankets and electrically connecting a bonding point of a first MLI blanket to a bonding point of a second MLI blanket is disclosed.

12 Claims, 3 Drawing Sheets

(52) U.S. Cl.
CPC ..... *B32B 2307/304* (2013.01); *B32B 2605/18* (2013.01)

(56) References Cited

U.S. PATENT DOCUMENTS

2003/0082332 A1    5/2003   Hasegawa et al.
2017/0145264 A1*   5/2017   Larson ..................... C09J 9/02

FOREIGN PATENT DOCUMENTS

| FR | 2976044 A1 | 12/2012 |
| JP | 2000-072099 A | 3/2000 |
| JP | 2014-184875 A | 10/2014 |

* cited by examiner

ELECTRICALLY CONNECTING MULTI-LAYER INSULATION BLANKETS

CROSS-REFERENCE TO RELATED APPLICATION

This application claims priority to European Patent Application EP 16 206 733.4 filed Dec. 23, 2016, the entire disclosure of which is incorporated by reference herein.

TECHNICAL FIELD

The present disclosure generally relates to multi-layer insulation (MLI) blankets and electrically connecting such MLI blankets. In particular, the present disclosure inter alia relates to an apparatus comprising at least two MLI blankets. Further, the present disclosure relates to a spacecraft comprising such an apparatus. Moreover, the disclosure relates to a method comprising providing at least two MLI blankets.

BACKGROUND

Many applications require thermal insulation of devices or components so as to protect these devices or components from damage and ensure their operating ability.

One example of thermally insulating means includes multi-layer insulation (MLI) blankets. MLI blankets are in particular capable of reducing thermal energy exchange by thermal radiation. MLI blankets generally comprise multiple dielectric and electrically conductive layers. Dielectric layers may for instance be formed by a dielectric substrate, e.g. a polyimide and/or polyester substrate. Conductive layers may for instance be formed by a conductive coating, e.g. a metal coating, such as aluminum or a silver coating for instance, on one side of a dielectric substrate or on both sides thereof. At least some of the layers mainly act as radiation-heat transfer barriers. Between the radiation-heat transfer barriers, thermally insulating spacers may be provided. An example of such a spacer is a scrim. An external layer of an MLI blanket may form an inner cover on one side of the internal layers of the MLI blanket and another external layer of the MLI blanket may form an outer cover on the opposite side of the MLI blanket, the inner cover and the outer cover thus covering the internal layers of the MLI blanket. The inner cover may refer to the cover of the MLI blanket that is configured to face a structure on which the MLI blanket is mounted.

Spacecraft, e.g. satellites, are a common field of application of MLI blankets, where the MLI blankets provide protection against both extreme heat and cold. In this field of application, the inner cover of an MLI blanket mounted on the spacecraft faces the spacecraft structure and the outer cover is configured to face space.

EP 2 530 366 A1 and FR 2 976 044 A1, for instance, disclose MLI blankets.

Electrical discharge may cause harm to a device or component thermally shielded by an MLI blanket. So as to prevent electric charge from accumulating and then, at some point, discharging, grounding of the MLI blanket, specifically of its conductive layers, is required. For spacecraft, regulations exist that require MLI blankets to be grounded.

Improvements in MLI blanket grounding are desirable.

SUMMARY

According to a first aspect, an apparatus is disclosed. The apparatus comprises at least two multi-layer insulation (MLI) blankets, each MLI blanket having a least one bonding point. Therein, a bonding point of a first MLI blanket of the at least two MLI blankets is electrically connected to a bonding point of a second MLI blanket of the at least two MLI blankets. The second MLI blanket further has a grounding point configured to be grounded.

According to a second aspect, a spacecraft comprising an apparatus according to the first aspect is disclosed.

According to a third aspect, a method is disclosed. The method comprises providing at least two multi-layer insulation (MLI) blankets, each MLI blanket having a least one bonding point. The method moreover comprises electrically connecting a bonding point of a first MLI blanket of the at least two MLI blankets to a bonding point of a second MLI blanket of the at least two MLI blankets. The second MLI blanket further has a grounding point configured to be grounded.

For the sake of conciseness, in the following description focus is put on providing further details on various implementations of the first aspect of the present disclosure. However, the information given with regard to the first aspect applies analogously to the second aspect and the third aspect.

Since, in the apparatus according to the first aspect, a bonding point of the first MLI blanket is electrically connected to a bonding point of the second MLI blanket and since the second MLI blanket further has a grounding point configured to be grounded, grounding of both the first MLI blanket and the second MLI blanket can be obtained by connecting the grounding point of the second MLI blanket to ground, e.g. to a designated point on a structure on which the apparatus is mounted. Thereby, on both MLI blankets, electrical charge is prevented from accumulating. Accordingly, grounding of the MLI blankets of the apparatus may be comparatively simple. A direct electrical connection of the first MLI blanket to ground potential via an own grounding point of the first MLI blanket may not be necessary. An own grounding point of the first MLI blanket may therefore be inexistent. The first MLI blanket may be grounded only indirectly. In turn, there may be one less point for grounding required, i.e. one less point having ground potential to which an own grounding point of the first MLI blanket would have to be connected if it existed. This may be particularly useful in case there is limited space for providing such a point for grounding on a structure on which the apparatus is mounted. With a bonding point of the first MLI blanket being electrically connected to a bonding point of the second MLI blanket, e.g. by a conductor such as a wire, the first and second MLI blankets may be referred to as being daisy-chained. Overall, the disclosed apparatus may thus allow for consolidating several MLI blankets to reduce the number of points for grounding needed on a structure on which the apparatus is mounted, while maintaining the same level of integration reliability and electromagnetic effects mitigation.

In case of a spacecraft, such as, for instance, a satellite, comprising the apparatus as in the second aspect of the present disclosure, the apparatus for instance being mounted on the spacecraft, providing points for grounding on the spacecraft structure may be a complicated task. While regulations often require conductive layers of MLI blankets to be grounded, the number of available points for grounding on the spacecraft structure, e.g. in the form of inserts on the structure or bonding points on a ground reference rail (for instance in case of the structure being made of carbon fiber panels, which is typical for spacecraft) etc., is limited. Limiting factors may for instance comprise electromagnetic compatibility (EMC)/electrical design of a ground reference rail network, the availability of space on the structure, provision of extra points for grounding in case of need for extra blankets, cost of integration of the points for grounding on the structure and ease of the integration of the MLI blankets. All of these factors may put the design and integration at risk from a cost and integration perspective. The need to add extra points for grounding on the structure can be extremely expensive to implement, especially at a later stage of spacecraft design or building. Hence, for example in spacecraft applications, daisy-chaining of MLI blankets as disclosed herein may mitigate these issues. Weight and space may be saved, spacecraft structural integrity may be optimized and engineering costs for design considerations to extend the ground reference rail network to accommodate points for direct grounding of each mounted MLI blanket may also be saved.

In an implementation, each of the first MLI blanket and the second MLI blanket comprises at least two bonding points, each of the at least two bonding points of the first MLI blanket is electrically connected to a bonding point of the second MLI blanket and each of the at least two bonding points of the second MLI blanket is electrically connected to a bonding point of the first MLI blanket. The provision of at least two bonding points on each of the first MLI blanket and the second MLI blanket, the bonding points being electrically connected, may further improve the reliability of the electrical connection of the first and second MLI blankets and thus of the grounding of the first MLI blanket. Regulations may moreover require grounding of each MLI blanket at at least two points. Generally, the second MLI blanket may have more than one grounding point configured to be grounded, in particular at least two grounding points, for redundancy.

In an implementation where each of the first MLI blanket and the second MLI blanket comprises at least two bonding points, a method according to the third aspect of the present disclosure may comprise electrically connecting each of the at least two bonding points of the first MLI blanket to a bonding point of the second MLI blanket; and electrically connecting each of the at least two bonding points of the second MLI blanket to a bonding point of the first MLI blanket.

In one variant of the above implementation of an apparatus according to the first aspect, each of the at least two bonding points of the first MLI blanket is electrically connected to each of the at least two bonding points of the second MLI blanket. Put differently, a first bonding point of the first MLI blanket may be connected to both a first bonding point of the second MLI blanket and a second bonding point of the second MLI blanket; and a second bonding point of the first MLI blanket may be connected to both the first bonding point of the second MLI blanket and the second pointing point of the second MLI blanket as well. Such a connection pattern is commonly referred to as cross-strapping. Cross-strapping of MLI blankets may contribute to improved reliability. Even if the electrical connection of a bonding point of the first MLI blanket to a bonding point of the second MLI blanket is damaged or interrupted, there may still be an intact electrical connection of the bonding point of the first MLI blanket to another bonding point of the second MLI blanket.

A corresponding implementation of a method according to the third aspect of the present disclosure may accordingly comprise electrically connecting each of the at least two bonding points of the first MLI blanket to each of the at least two bonding points of the second MLI blanket.

Applying the above disclosure to an implementation in which more than two MLI blankets are provided, in such an implementation a bonding point of each MLI blanket may be electrically connected to a bonding point of another MLI blanket. Therein, at least one of the MLI blankets comprises at least one grounding point configured to be grounded. In one variant, each of the MLI blankets may comprise at least two bonding points, wherein each of the at least two bonding points is electrically connected to a bonding point of another MLI blanket. In the context of this variant, each of at least two bonding points of each MLI blanket may be electrically connected to each of at least two bonding points of another MLI blanket.

In an implementation, the first MLI blanket and the second MLI blanket are neighboring MLI blankets. Thus, electrical connections between bonding points of the first MLI blanket and the second MLI blanket, e.g. established by wires, may be comparatively short. Accordingly, in an implementation in which more than two MLI blankets are provided, each pair of MLI blankets having electrically connected bonding points may be neighboring MLI blankets. Electrically connecting bonding points of neighboring blankets may help in saving weight and costs. However, implementations in which MLI blankets having electrically connected bonding points are not neighboring, i.e. are not directly adjacent blankets, are also possible.

In an implementation, a surface area of the second MLI blanket is greater than a surface area of the first MLI blanket. In this context, the surface area of an MLI blanket may refer to an area covered by the MLI blanket in a plane perpendicular to the dimension in which the layers of the MLI blanket are stacked. Put differently, the surface area may refer to an area of a section through the MLI blanket in a plane perpendicular to the dimension in which the layers of the MLI blanket are stacked. The surface area of the second MLI blanket may for instance be at least twice as large as that of the first MLI blanket, in particular at least five times as large, for instance at least ten times as large, e.g. between ten and fifteen times as large.

In one variant, the ratio of the surface area of the second MLI blanket to the surface area of the first MLI blanket is such that a maximum differential voltage requirement is met. The maximum differential voltage requirement may for instance be a requirement defining a maximum differential voltage that may be present between a dielectric and a conductor without an electrostatic discharge occurring. The dielectric may be the outer covers of the first and second MLI blankets, i.e. external layers of the first and second MLI blankets. For instance, during a mission of a spacecraft on which the apparatus is mounted, it may be reasonably assumed that the electrical charges will be accumulated on the outermost dielectric layer. The conductor may be an electrically conductive part of a structure on which the apparatus is mounted, e.g. an electrically conductive spacecraft part. The maximum differential voltage may for instance be in the order of −1000 V.

According to an example, the total quasi-static electric resistance of a current path from the first MLI blanket to the grounding point of the second MLI blanket is such that the maximum differential voltage requirement is met. The current path may for instance be a current path from a point on the first MLI blanket that is farthest from the grounding point of the second MLI blanket. As the differential voltage linearly depends on the quasi-static electric resistance, if the resistance is below an upper limit, for an assumed value of the current, the differential voltage is as well. As the electrical discharge is a low-frequency phenomenon, considering the quasi-static resistance is appropriate. If the surface area of the second MLI blanket is significantly larger than that of the first MLI blanket, the influence of the first MLI blanket on the overall quasi-static electric resistance of the daisy-chained first and second MLI blankets may be negligible. Hence, if the maximum differential voltage requirement was met for the directly grounded second MLI blanket without it being daisy-chained to the first MLI blanket, it may then be assumed that the differential voltage requirement is still met with daisy-chaining.

In an implementation, a bonding point of an MLI blanket is electrically connected to a conductive layer of the MLI blanket. Thus, electrical charge that has accumulated may be bled off via the conductive layer, to the bonding point and thus—potentially (for the first MLI blanket) via a bonding point of another MLI blanket—to ground. The conductive layer electrically connected to the bonding point may or may not be an internal layer of the MLI blanket. The conductive layer electrically connected to the bonding point may be the conductive layer closest to an external, e.g. dielectric, layer of the MLI blanket, for instance closest to an outer cover thereof. In particular, a bonding point may be electrically connected to several of the conductive layers of an MLI blanket, for instance all of the conductive layers or at least all of the internal conductive layers of the MLI blanket. A bonding point of an MLI blanket may comprise an electrically conductive element, such as a conductive, e.g. metal, foil, connected to the respective layer or layers. The bonding point may have a connector, e.g. in the form of a tab, configured to connect to a conductor. The connector, for instance a grounding wire, may thus enable or at least simplify establishing an electrical connection between the bonding point and another bonding point by the conductor.

In an implementation, a grounding point of an MLI blanket is electrically connected to a conductive layer of the MLI blanket. The disclosure provided above with respect to bonding points applies correspondingly to grounding points. Therein, an electrically conductive, e.g. metal, element comprised by the grounding point may for instance be a bolt or screw or the like. According to one example, the electrically conductive element passes through all of the conductive layers of an MLI blanket thereby electrically connecting thereto.

A main difference between a bonding point of an MLI blanket and a grounding point of an MLI blanket may be the different purposes of the bonding points (electrical connection to a bonding point of another MLI blanket) on the one hand and the grounding points (electrical connection to a point for grounding with ground potential, e.g. provided on a structure on which the apparatus is mounted) on the other hand. If a bonding point of an MLI blanket and a grounding point of that MLI blanket share a conductive layer to which they are both electrically connected, electrical charges may pass from the bonding point via the grounding point to ground.

In an implementation, the grounding point of the second MLI blanket is electrically connected to a point with ground potential on a structure on which the apparatus is mounted.

Other features of the present disclosure will become apparent from the following detailed description considered in conjunction with the accompanying, example drawings. However, the drawings are designed solely for purposes of illustration and not as a definition of the limits of the disclosure, for which reference should be made to the appended claims. The drawings are not drawn to scale. They are merely intended to conceptually illustrate the structures and procedures described herein.

It will also be appreciated that while the below examples are primarily described in the context of an apparatus comprising two daisy-chained MLI blankets, each MLI blanket having two bonding points that are electrically connected to the bonding points of the respective other MLI blanket, the present disclosure is not limited to examples comprising two daisy-chained MLI blankets. Variants in which more than two MLI blankets are daisy-chained are also contemplated within the present disclosure. Likewise, variants in which an MLI blanket has more than two bonding points electrically connected to bonding points of another MLI blanket are contemplated. Furthermore, while the below examples are primarily described in the context of spacecraft applications, the present disclosure is not limited to these applications.

DETAILED DESCRIPTION

Figure 1:
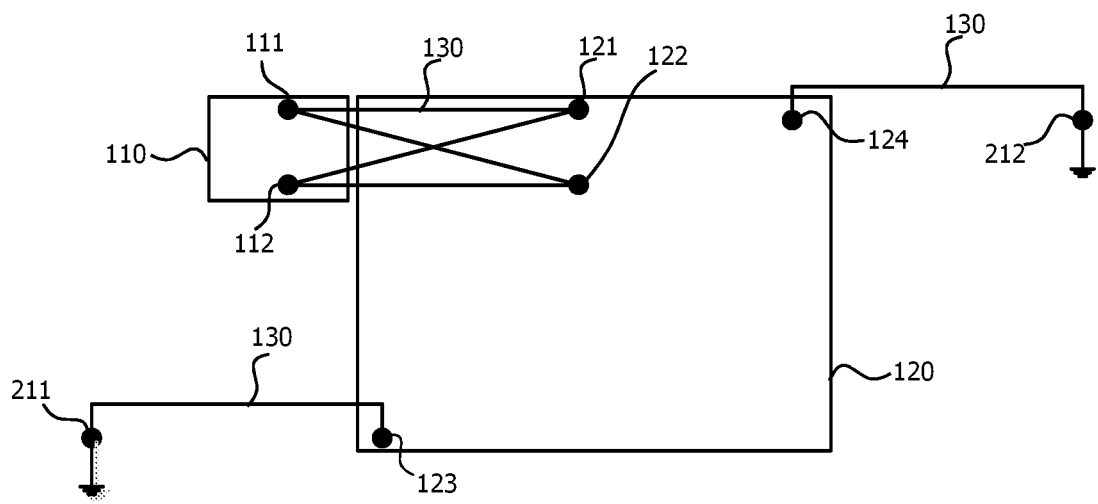
FIG. 1 is a schematic illustration of an example of an apparatus according to the first aspect of the present disclosure.

FIG. 1 is a schematic illustration of an example of an apparatus 100 according to the first aspect of the present disclosure.

The apparatus 100 comprises a first MLI blanket 110 and a neighboring second MLI blanket 120. The first MLI blanket 110 has two bonding points 111, 112. It is noted that the bonding points 111, 112 do not have to be in the middle of the first MLI blanket, but that it may contribute to increased mechanical stability if the bonding points 111, 112 are arranged near the edge of the first MLI blanket 110 closer to second MLI blanket 120. The second MLI blanket 120 has two bonding points 121, 122. The second MLI blanket 120 further exhibits two grounding points 123, 124. Electrical conductors 130, e.g. grounding wires, electrically connect the bonding points 111, 112, 121 and 122 with each other and also connect the grounding points 123, 124 to points for grounding 211 and 212, respectively.

Figure 2:
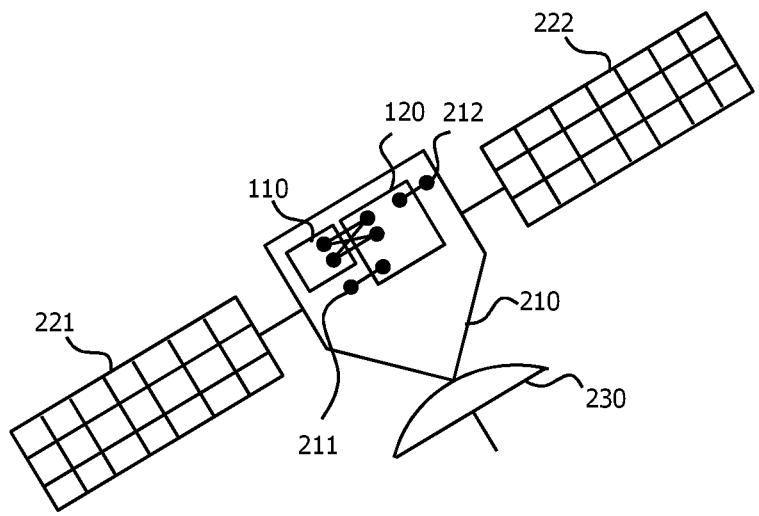
FIG. 2 is a schematic illustration of an example of a spacecraft according to the second aspect of the present disclosure, the spacecraft comprising the apparatus of FIG. 1.

FIG. 2 shows a schematic illustration of an example of a spacecraft 200, in the present example a satellite, according to the second aspect of the present disclosure, the spacecraft 200 comprising the apparatus 100 of FIG. 1.

The satellite 200 comprises a main body 210, two solar panels 221, 222 attached thereto and an antenna 230. On the main body 210, apparatus 100 is mounted so that its MLI blankets 110, 120 cover a part of the main body 210, specifically a part of the main body 210 behind which devices sensitive to the effects of electrical discharge are arranged, for instance sensitive instruments such as a spectrometer. The satellite main body 210 is mainly made of carbon fiber panels, but it has a ground reference rail to which electrical connections may be established for grounding.

Returning now to FIG. 1, first bonding point 111 of the first MLI blanket 110 is directly connected in series to first bonding point 121 of the second MLI blanket 120. In addition, bonding point 111 is also connected to second bonding point 122 of second MLI blanket 120. Similarly, second bonding point 112 of first MLI blanket 110 is directly connected in series to each of bonding points 121 and 122 of second MLI blanket 120. Put differently, each of the bonding points 111 and 112 of the first MLI blanket 110 is electrically connected to each of the bonding points 121 and 122 of the second MLI blanket 120 in a cross-strapped manner. The electrical connections of the bonding points 111, 112 of first MLI blanket 110 to the bonding points 121, 122 of second MLI blanket 120 result in the first and second MLI blankets 110, 120 being daisy-chained.

Each of the bonding points 111, 112, 121 and 122 is electrically connected to at least one conductive layer of the respective MLI blanket 110 or 120. In the present example, all of the conductive layers of MLI blanket 110 are connected to bonding points 111 and 112. For MLI blanket 120, the bonding points 121 and 122 by design may connect the outermost conductive layer or may connect all of the conductive layers of MLI blanket 120. Moreover, in the present example, each of the bonding points comprises a conductive metal foil having a tab attached at one end thereof, the tap being configured to be connected to a grounding wire 130.

Each of the grounding points 123 and 124 comprises a bolt or screw passing through all of the conductive layers of the second MLI blanket 120, thereby electrically connecting thereto. Like the bonding points, also grounding points 123 and 124 have tabs provided at one end thereof for being connected to grounding wires 130 that are connected to the points for grounding 211 and 212.

An electrical current may thus flow from the conductive layer(s) of the first MLI blanket 110 to which a bonding point 111, 112 is connected via grounding wires 130 to a bonding point 121, 122 of the second MLI element 120 and, via a conductive layer of the second MLI element 120 to which a bonding point 121, 122 is connected, to a grounding point 123, 124 and thus be led off to ground. Consequently, electrical charges accumulating on the dielectric outer covers of MLI blankets 110 and 120 may migrate to the underlying conductive layer of the respective MLI blanket and may thus be led off to ground. In case of the first MLI blanket 110 this is enabled due to the daisy-chaining. Electrical charges may flow via at least one pair of bonding points, wherein one bonding point is provided on the first MLI blanket 110 and the second MLI blanket 120.

Thus, while regulations often require conductive layers of MLI blankets to be grounded, due to the daisy-chaining of the first MLI blanket 110 and the second MLI blanket 120, it is not necessary to provide a separate point for grounding on a structure on which the apparatus 100 is mounted for the first MLI blanket 110. It is sufficient that there are points for grounding 211, 212 on the structure which grounding points 123, 124 of the second MLI blanket 120 are connected. The thus reduced number of required points for grounding on the structure, e.g. on a ground reference rail of satellite main body 210, may simplify design of the structure, in the present example spacecraft 200, and may contribute to saving costs. The problem of the limited availability of space for providing points for grounding may be particularly prominent in spacecraft applications. Consolidating MLI blankets as disclosed herein may not only mitigate this problem but also facilitate MLI blanket integration as well as help saving weight and maintaining structural integrity.

The two bonding points 111, 112 of the first MLI blanket 110 being cross-strapped to the two bonding points 121, 122 of the second MLI blanket 120 improves the reliability of the electrical connection of the first and second MLI blankets 110, 120 and thus of the grounding of the first MLI blanket 110. Even if the electrical connection of a bonding point 111 or 112 of the first MLI blanket 110 to a bonding point 121 or 122 of the second MLI blanket 120 is damaged or interrupted, there may still be an intact electrical connection to the respective other bonding point of the second MLI blanket 120. Regulations may generally require that an MLI blanket has at least two grounding points. For the second MLI blanket 120, the grounding points 123 and 124 are therefore provided. For the first MLI blanket 110, the bonding points 111 and 112 serve as a grounding point substitute.

Figure 3:
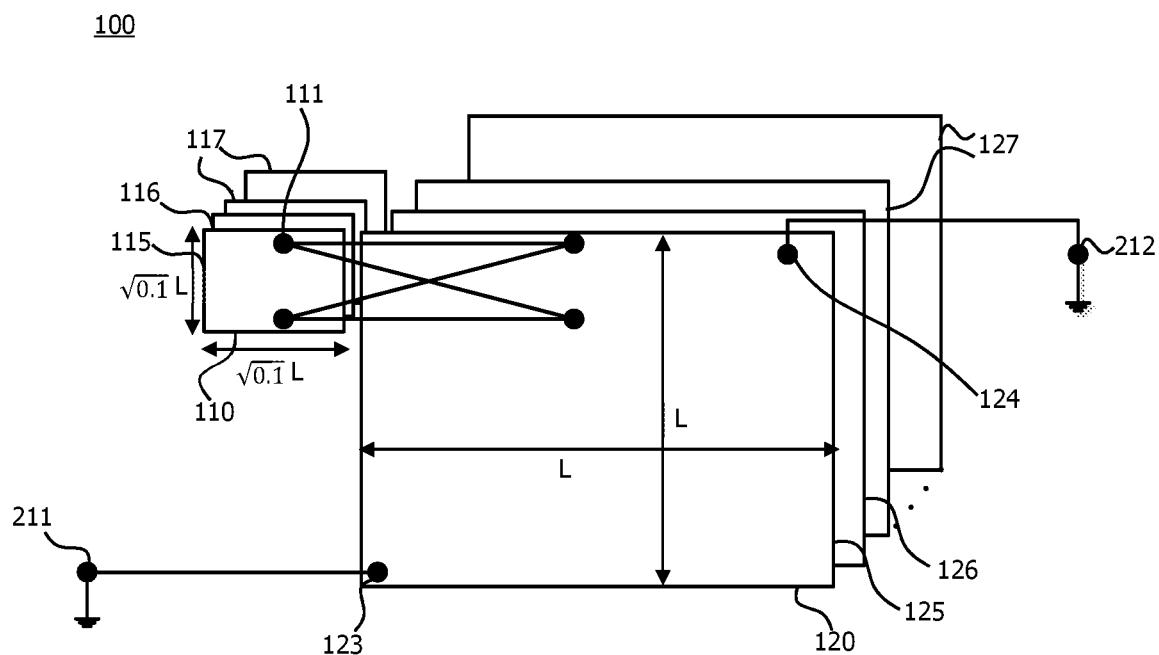
FIG. 3 is a schematic illustration providing details on an example configuration of the MLI blankets of the apparatus of FIG. 1.

FIG. 3 is a schematic illustration providing details on an example configuration of the MLI blankets 110, 120 of the apparatus 100 of FIG. 1.

As shown in FIG. 3, first MLI blanket 110 comprises layers 115, 116 and 117. Layer 115 is an external layer, specifically an outer cover facing towards space when installed on satellite 200. The rearmost layer of layers 117 is as well an external layer, specifically and inner cover facing towards satellite main body 210 when installed on satellite 200. MLI blanket 120 comprises layers 125, 126 and 127 and is essentially configured as MLI blanket 110, i.e. layer 125 is an outer cover, the rearmost layer of layers 127 is an inner cover and the layers in between are internal layers. Layers 115 and 125 are dielectric polyimide layers on the external face towards space and conductive vapor deposited aluminum on the inner face. Layers 116 and 126 are electrically conductive layers with vapor deposited aluminum on each of the two faces with a dielectric substrate layer in the middle. Similarly the rearmost layers 117 and 127 have vapor deposited aluminum coating on the inner face and dielectric polyimide layer on the external face facing towards satellite main body 210 when installed on satellite 200.

In the present example, it is assumed that both MLI blankets 110, 120—and thus each of layers 115, 116 and 117 as well as each of layers 125, 126 and 127—has a square surface. The edge length the second MLI blanket 120 is assumed to be L and the surface area is assumed to be 'S' m². The edge length the first MLI blanket 110 is assumed to be $\sqrt{0.1}$L, the surface area thus being '0.1 S' m². Accordingly, the total surface area of the first MLI blanket 110 and the second MLI blanket 120 is $S_{tot}$=1.1 S m². It is further assumed that each of the vapor-deposited aluminum (VDA) layers 116 and 126 has a thickness of 1000 Å.

Denoting the differential voltage between dielectric the dielectric layers 115 and 125 of MLI blankets 110 and 120 and ground, i.e. points 211 and 212, $V_{daisy-chained}$, the following applies (note that discharge is a low-frequency phenomenon so that a quasi-static approximation may reasonably be made):

$$V_{daisy-chained}=I \times R \qquad \text{equation (1):}$$

Therein, I denotes the current (unit: A) that will propagate from the dielectric layers 115 and 125 of MLI blankets 110 and 120 to the underneath conductive layers 116 and 126 and then through at least one of grounding points 123 and 124 to at least one of points 211 and 212, i.e. to ground, e.g. to satellite main body 210. R denotes the direct current resistance (Ω) of the entire current path and is defined in equation (3) below.

The requirement of 10 nA/cm² stipulated by the European Cooperation for Space Standardization (ECSS) for the maximum volume current density J translates into current I as:

$$I = J \times S_{tot} = 10 \text{ nA/cm}^2 \times 1.1S \times 10^4 \text{ cm}^2 = 1.1S \times 10^{-5} \text{(unit: A)} \quad \text{equation (2):}$$

For a calculation of resistance R, the following quasi-static approximation is used.

$$R = l/\sigma A \quad \text{equation (3):}$$

Note that in equation (3) above, l is the length of the resistance path (including the dimensions of the first MLI blanket 110), σ is the direct current electrical conductivity (S/m) of a VDA layer 116, 126 and A is the cross-sectional area of the current path. It is reasonably assumed that the charges will be accumulated on the outermost dielectric layer 115, 125 of the MLI blankets 110 and 120, e.g. during a mission of satellite 200 if apparatus 100 is mounted thereon, and that these charges will migrate to the VDA layers 116, 126 underneath and then propagate to the conductive structure used for grounding, e.g. satellite main body 210, resulting in current flow.

Using equations (2) and (3) in equation (1), one has:

$$V_{daisy\text{-}chained} = 1.1S \times 10^{-5} \times R (\text{unit}: V)$$

Assuming a worst-case scenario for the length l of the resistance path in which the predominant current density propagates from the top left point of first MLI blanket 110 in FIG. 3 (e.g. assuming that bonding point 111 is located in the top left corner) to the bottom right point of second MLI blanket 120 (e.g. assuming that bonding point 124 is located in the bottom right corner) first in a horizontal direction and then in a vertical direction, the length l would be $\sqrt{0.1L} + 2$ L, i.e. approximately 2.316 L. Further considering that current will primarily flow via the conductive VDA layers 116 and 126 and assuming that the cross-sectional area of first MLI blanket 110 has negligible contribution, the cross-sectional area A of the current flow path may be calculated as the thickness of 1000 Å of the VDA layer 126 times the height L, i.e. $A = 10^{-7}$ L m². For the direct current electrical conductivity a, a typical value of $3.5 \times 10^{-7}$ S/m may be assumed, leading to a value for the direct current resistance R of approximately 0.7Ω. Thus, $V_{daisy\text{-}chained} = 0.78 \times 10^{-5}$ S (unit: V).

Now separately considering directly grounded second MLI blanket 120 without first MLI blanket 110 daisy-chained thereto (first MLI blanket 110 may for example itself be directly grounded) and taking into account that for the length l of the resistance path l=2 L then applies, the direct current resistance $R_{no\text{-}daisy\text{-}chain}$ would be approximately 0.57Ω and the differential voltage $V_{no\text{-}daisy\text{-}chain}$ would be:

$$V_{no\text{-}daisy\text{-}chain} = S \times 10^{-5} \times R_{no\text{-}daisy\text{-}chain} = 0.57 \times 10^{-5} S \quad (\text{unit}: V).$$

Thus, if one is to normalize the differential voltage drop due to the daisy-chaining of first and second MLI blankets 110, 120, one has:

$$20 \log\left(\frac{V_{daisy\text{-}chained}}{V_{no\text{-}daisy\text{-}chain}}\right) = 2.6 \text{ dB}$$

Therefore, the assumption that daisy-chaining the first MLI blanket 110 and the second MLI blanket 120 for the purpose of grounding the first MLI blanket 110 will have a negligible effect on the differential voltage is justified. Even with the worst-case assumption of the maximum allowable current density predominantly propagating in one direction, the differential voltage change is merely 2.6 dB.

Thus, if $V_{no\text{-}daisy\text{-}chain}$ is well below a maximum differential voltage, which may be in the order of −1000 V, $V_{daisy\text{-}chained}$ will also be below the maximum differential voltage. Thus, in the present example, the ratio of the surface area of the second MLI blanket 120 to the surface area of the first MLI blanket 110 is such that the maximum differential voltage requirement is met even if daisy-chaining is applied. The total quasi-static electric resistance of the current path from the top left point of the first MLI blanket 110 in FIG. 3 to the bottom right point of the second MLI blanket 120 is low enough that the differential voltage $V_{daisy\text{-}chained}$ does not exceed the maximum differential voltage. Consolidating MLI blankets 110, 120 does in the present example therefore not significantly affect electromagnetic compatibility.

Figure 4:
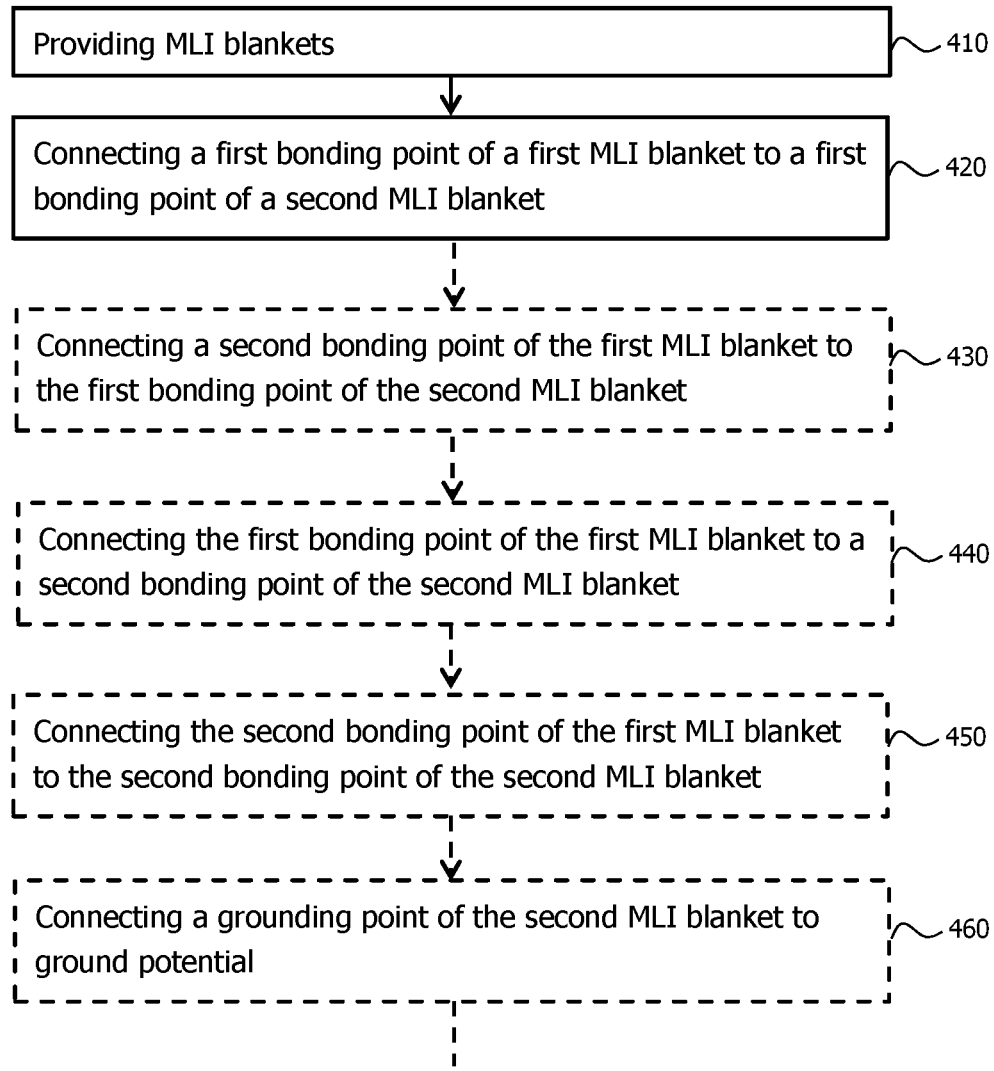
FIG. 4 is a flow chart schematically illustrating an example of a method according to the third aspect of the present disclosure.

FIG. 4 is a flow chart 400 schematically illustrating an example of a method according to the third aspect of the present disclosure. The method may for instance be performed in relation to the apparatus 100 of FIG. 1, optionally in the context of an application of the apparatus 100 for the spacecraft 200 of FIG. 2. In the flow chart 400, the blocks of steps 430, 440, 450 and 460 are shown with dashed outlines as it is optional to consider them part of the example.

As shown in flow chart 400, in a first step 410, at least to MLI blankets are provided, e.g. MLI blankets 110 and 120 of apparatus 100. Step 420 comprises electrically connecting a first bonding point of a first MLI blanket of the MLI blankets provided in step 410 (e.g. bonding 111 of MLI blanket 110) to a first bonding point of a second MLI blanket provided in step 410 (e.g. bonding point 121 of MLI blanket 120). The second MLI blanket has at least one grounding point (such as grounding points 123 and 124 of apparatus 100) configured to be connected to a point for grounding (such as points 211 and 212 on the main body 210 of satellite 200). Step 430 comprises electrically connecting a second bonding point of the first MLI blanket (e.g. bonding point 112) to the first bonding point of the second MLI blanket. Step 440 comprises electrically connecting the first bonding point of the first MLI blanket to a second bonding point of the second MLI blanket (e.g. bonding point 122). Step 450 comprises electrically connecting the second bonding point of the first MLI blanket to the second bonding point of the second MLI blanket.

In step 460, a grounding point of the second MLI blanket (e.g. one or both of grounding points 123 and 124) is connected to ground potential, for instance by establishing a connection to a point for grounding on a structure on which the first and second MLI blankets are mounted (e.g. points 211 and 212 on the main body 210 of the satellite 200).

It will be understood that the order of steps 420, 430, 440, and 450 may be changed, i.e. that the order in which bonding points on the blankets are electrically connected may not be crucial. It will also be understood that step 460 may likewise be performed before a first connection between bonding points of MLI blankets is established and may also be performed in between the connecting of bonding points or concurrently with it.

All presented embodiments are only examples. Any feature presented for a certain embodiment may be used with any aspect of the disclosure on its own or in combination with any feature presented for the same or another example embodiment and/or in combination with any other feature not mentioned. Any feature presented for an example embodiment in a certain category may also be used in a corresponding manner in an example embodiment of any other category.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus comprising:
   at least two multi-layer insulation (MLI) blankets, including a first MLI blanket and a second MLI blanket, each MLI blanket having at least two bonding points, including a first bonding point and a second bonding point of the first MLI blanket, and a first bonding point and a second bonding point of the second MLI blanket;
   wherein the second MLI blanket further has a grounding point configured to be grounded;
   wherein the first bonding point and the second bonding point of the first MLI blanket are each electrically connected to either or both of the first bonding point and the second bonding point of the second MLI blanket; and
   wherein the first bonding point and the second bonding point of the second MLI blanket are each electrically connected to either or both of the first bonding point and the second bonding point of the first MLI blanket.

2. The apparatus according to claim 1, wherein the first bonding point and the second bonding point of the first MLI blanket are each electrically connected to the first bonding point and the second bonding point of the second MLI blanket; and
   wherein the first bonding point and the second bonding point of the second MLI blanket are each electrically connected to the first bonding point and the second bonding point of the first MLI blanket.

3. The apparatus according to claim 2,
   wherein each of the at least two bonding points of the first MLI blanket is electrically connected to each of the at least two bonding points of the second MLI blanket.

4. The apparatus according to claim 1, wherein the first MLI blanket and the second MLI blanket are neighboring MLI blankets.

5. The apparatus according to claim 1, wherein a surface area of the second MLI blanket is greater than a surface area of the first MLI blanket.

6. The apparatus according to claim 5, wherein a ratio of the surface area of the second MLI blanket to the surface area of the first MLI blanket is such that a maximum differential voltage requirement is met.

7. The apparatus according to claim 1, comprising at least one of:
   the first bonding point or second bonding point of the first MLI blanket or the first bonding point or second bonding point of the second MLI blanket is electrically connected to a conductive layer of the bonding point's respective MLI blanket; and
   the grounding point of the second MLI blanket is electrically connected to a conductive layer of the second MLI blanket.

8. The apparatus according to claim 1, wherein the grounding point is electrically connected to a point with ground potential on a structure on which the apparatus is mounted.

9. A spacecraft comprising an apparatus according to claim 1.

10. A method comprising:
    providing at least two multi-layer insulation (MLI) blankets, including a first MLI blanket and a second MLI blanket, each MLI blanket having at least two bonding points, including a first bonding point and a second bonding point of the first MLI blanket, and a first bonding point and a second bonding point of the second MLI blanket;
    electrically connecting each of the first bonding point and the second bonding point of the first MLI blanket to to the first bonding point and the second bonding point of the second MLI blanket; and
    electrically connecting each of the first bonding point and the second bonding point of the second MLI blanket to the first bonding point and the second bonding point of the first MLI blanket, wherein the second MLI blanket further has a grounding point configured to be grounded.

11. The method according to claim 10,
    wherein the first bonding point and the second bonding point of the first MLI blanket are each electrically connected to the first bonding point and the second bonding point of the second MLI blanket; and
    wherein the first bonding point and the second bonding point of the second MLI blanket are each electrically connected to the first bonding point and the second bonding point of the first MLI blanket.

12. The method according to claim 11 comprising:
    electrically connecting each of the at least two bonding points of the first MLI blanket to each of the at least two bonding points of the second MLI blanket.

* * * * *